(12) United States Patent
Childers

(10) Patent No.: US 6,754,396 B1
(45) Date of Patent: Jun. 22, 2004

(54) METHOD OF PROCESSING OF A SINGLE RASTER ELEMENT OF A SKELETONIZED BINARY IMAGE THROUGH THE USE OF TILES

(75) Inventor: Jeffrey F. Childers, Henniker, NH (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/255,170

(22) Filed: Feb. 22, 1999

(51) Int. Cl.[7] .............................. G06T 5/20; G06T 1/60; G06F 12/12
(52) U.S. Cl. ....................................... 382/259; 711/133
(58) Field of Search ................................ 382/259, 258, 382/257, 256, 205, 195, 304; 711/118, 133, 134, 135

(56) References Cited

U.S. PATENT DOCUMENTS

| | | | |
|---|---|---|---|
| 3,975,709 A | 8/1976 | Beun et al. | 382/259 |
| 4,491,960 A | 1/1985 | Brown | 382/176 |
| 4,665,441 A * | 5/1987 | Sakaue et al. | 382/258 |
| 5,224,179 A | 6/1993 | Denker et al. | 382/259 |
| 5,335,290 A | 8/1994 | Cullen et al. | 382/204 |
| 5,875,267 A * | 2/1999 | Djakovic | 382/263 |

FOREIGN PATENT DOCUMENTS

JP 58-163078 * 9/1983 ............ G06K/9/44

OTHER PUBLICATIONS

Carlo Arcelli, "A Condition for digital Points Removal", Oct. 1979 *Signal Processing*, vol. 1, No. 4, pp. 283–285.

Theo Pavlidis, "A Thinning Algorithm for Discrete Binary Images", 1980 *Computer Graphis and Image Processing*, vol. 13, pp. 142–157.

T. Y. Zhang et al., "A Fast Parallel Algorithm fo rThinning Digital Patterns", Mar. 1984 *Communications of the ACM*, vol. 27, No. 3, pp. 236–239.

* cited by examiner

*Primary Examiner*—Scott Rogers
(74) *Attorney, Agent, or Firm*—Gates & Cooper LLP

(57) ABSTRACT

A process for producing a skeleton from a raster image by overlaying a plurality of tiles on the raster image, wherein each of the tiles identifies a sub-region of the raster image comprised of a plurality of pixels. The sub-regions are selectively skeletonized and then cached for subsequent access. Some or all of the cache is invalidated when one or more of the sub-regions are modified. Only those sub-regions that have been modified are re-skeletonized, on an "as needed" basis.

30 Claims, 4 Drawing Sheets

METHOD OF PROCESSING OF A SINGLE RASTER ELEMENT OF A SKELETONIZED BINARY IMAGE THROUGH THE USE OF TILES

BACKGROUND OF THE INVENTION

1. Field of the Invention

The present invention relates to a method for processing of a single raster element of a skeletonized binary image through the use of tiles.

2. Description of the Related Art

An image skeleton represents the basic structure of an image and is created by decomposing the widths of raster objects in the image to uniform single pixel widths. This simplifies the task of certain recognition systems from character recognition to geometrical recognition.

The current state of the art provides a process for skeletonization of an image by stripping one layer of pixels after another. The process continues until the set of pixels left form a one pixel wide line and is defined as separating two "off" areas. This process is known as raster "thinning" or "erosion."

The problems associated with the current skeletonization processes include their relatively slow speed and extensive memory utilization requirements. In order to skeletonize the image using the current techniques, two copies of the image must be maintained in memory. For large images, this could mean storing an extraordinary, amount of data. The larger the data file, the greater the access time. Therefore, the process of data retrieval and storage increases in time with the increased amount of data stored.

Also, every pixel in the image is evaluated regardless of whether the pixel will be removed or ignored. This requires a substantial increase in the number of points to be evaluated and increases the amount of time required to complete the process.

The prior art discloses a number of devices utilizing appropriated methods and apparatus for skeletonization of images used in pattern recognition. For example, U.S. Pat. No. 3,975,709 to Beun et al. and U.S. Pat. No. 5,224,179 to Denker et al. disclose methods of image thinning or skeletonization utilizing at least 3×3 pixel by pixel analysis to thin a character of interest.

Another reference, U.S. Pat. No. 5,335,290 to Cullen et al., teaches a character recognition system by extracting run lengths for each scanline from the bit mapped representation of the document image and classifying the data as image, text or as a horizontal or vertical line. However, there is no teaching of the process of skeletonization by run length comparison which is needed to increase speed of the pattern recognition.

Still another reference, U.S. Pat. No. 4,491,960 to Brown, describes a pattern comparison system wherein a raster scan of a hand print produces a topography to be compared to a given parameters for identification.

Yet another reference, Zhang et al., "A Fast Parallel Algorithm for Thinning Digital Patterns", discloses skeletonization via pixel by pixel comparison and removal of subsequent outer pixels for character thinning.

However, the prior art fails to address the problem of size of data files and speed of skeletonization and does not disclose, teach or even suggest the embodiments of the claimed invention.

SUMMARY OF THE INVENTION

To address the requirements described above, the present invention discloses a method, apparatus, and article of manufacture for producing a skeleton from a raster image by overlaying a plurality of tiles on the raster image, wherein each of the tiles identifies a sub-region of the raster image comprised of a plurality of pixels. The sub-regions are selectively skeletonized and then cached for subsequent access. Some or all of the cache is invalidated when one or more of the sub-regions are modified. Only those sub-regions that have been modified are re-skeletonized, on an "as needed" basis.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
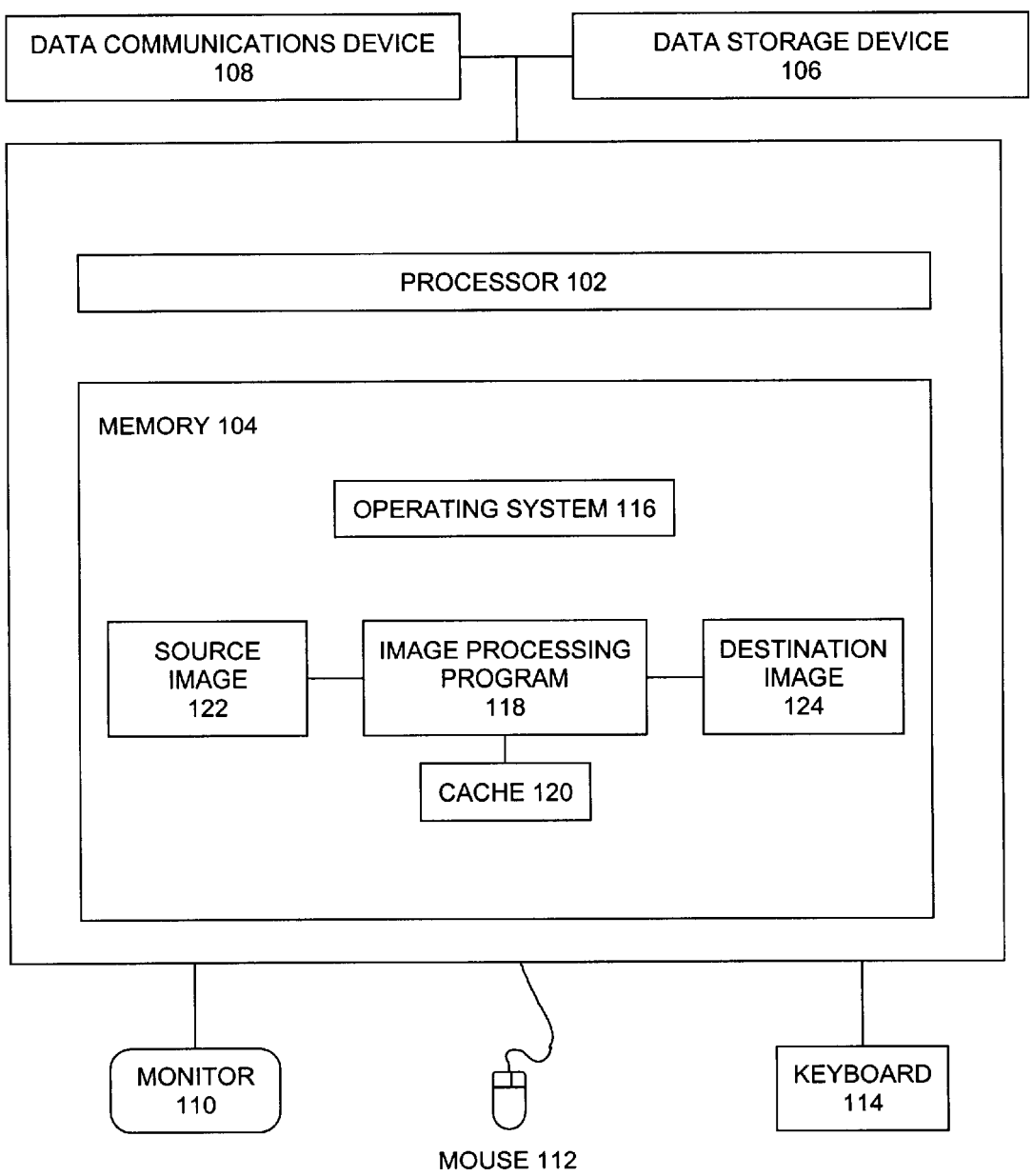
FIG. 1 illustrates an exemplary hardware environment for the present invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The present invention is usually implemented by one or more image processing programs 118 with one or more attendant caches 120 that skeletonize a binary source image 122 to create a skeleton destination image 124. However, it should be understood that, in the alternative, the principles of the invention may also apply to specific utilities or functions within the operating system 116 itself. In general, the functions performed in the present invention, whether implemented as part of an operating system 116 or a specific program 118, will be referred to herein as "computer programs".

Generally, the image processing program 118 that implements the preferred embodiment of the invention is embodied in or readable from a computer-readable device, medium or carrier, e.g., one or more of the fixed and/or removable data storage data devices 106 and/or a remote device attached to the computer 100 via the data communications devices 108. Under control of operating system 116, the image processing program 118 may be loaded from the data storage devices 106 or data communications devices 108 into the memory 104 of computer 100. The image processing program 118 comprises instructions which, when read and executed by computer 100, cause the computer 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Processing Sub-Regions Using Tiles

Figure 2:
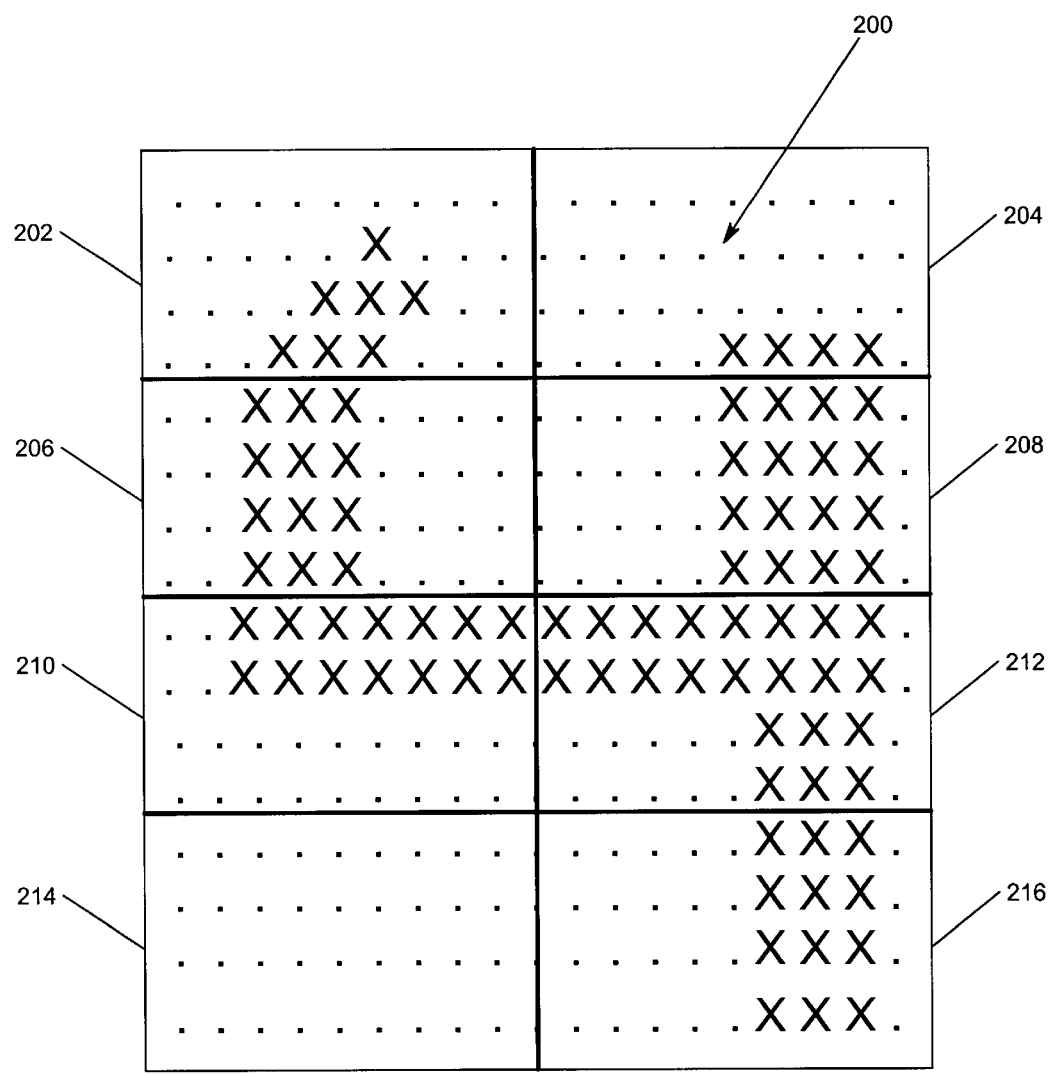
FIG. 2 shows an original binary source image according to the preferred embodiment of the present invention.
Figure 3:
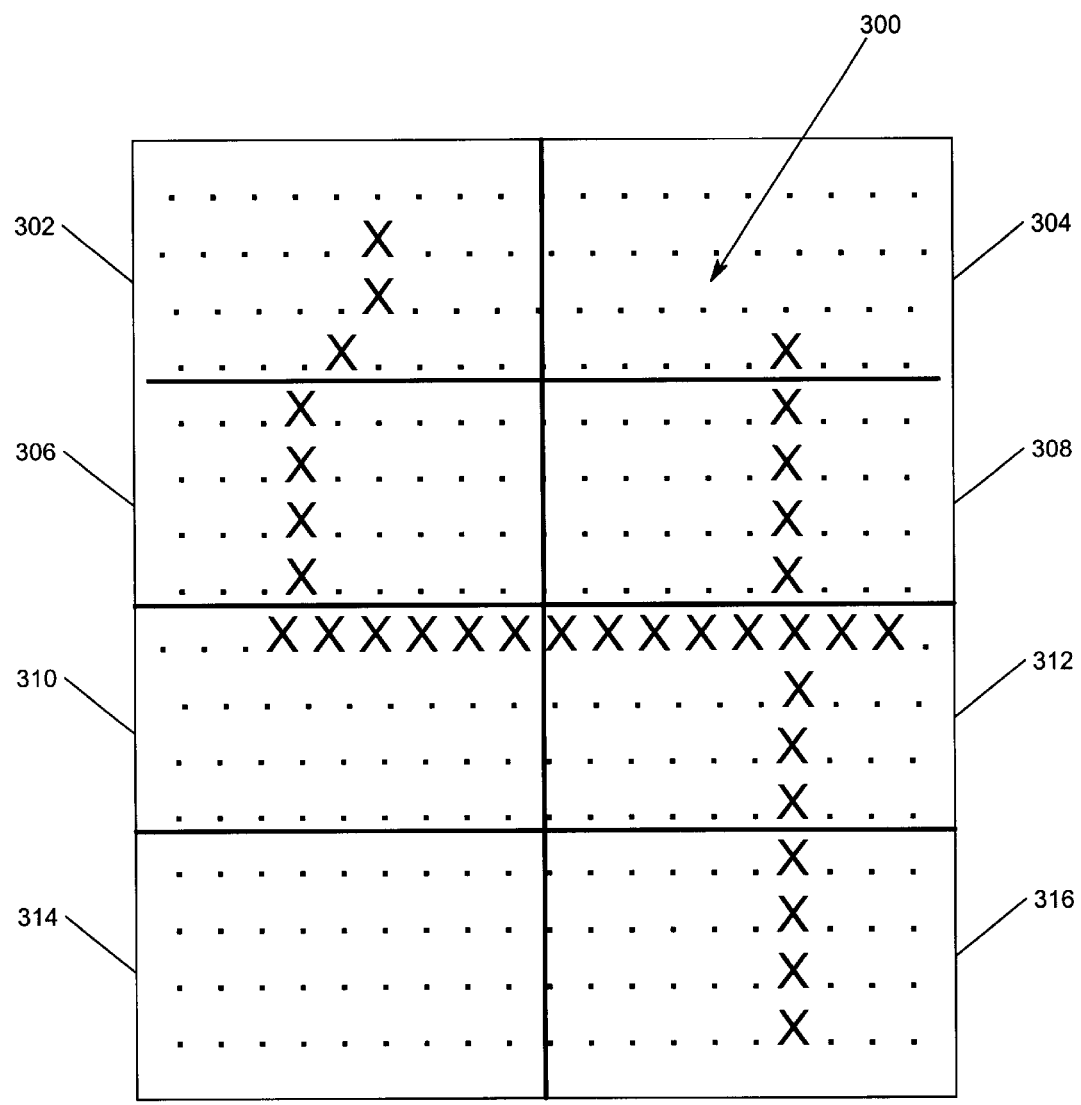
FIG. 3 shows a skeletonized destination image generated by the image processing program from the source image according to the preferred embodiment of the present invention.

A typical system for retrieving lines and arcs from raster image geometry may use a skeleton of the image for its processing. FIG. 2 shows a raster source image 200, wherein the pixel positions are denoted by "X" (ON) and "." (OFF) and FIG. 3 shows a skeletonized destination image 300 generated by the image processing program 118 from the source image 200. In this example, the source image 200 is subdivided into sub-regions identified by tiles 202–216 for more efficient processing. Preferably, the sub-regions are comprised of a plurality of pixels and are sized in such a manner as to encompass a single raster element of the raster source image 200. Moreover, the sub-regions may be identified by geometric shapes other than tiles 202–216.

The skeleton 300 is generated by selectively deleting pixels from the source image 200 in such a way as to leave a single pixel in the middle of each raster "line". The processing time required to generate the skeleton 300 is proportional to the size of the source image 200 and represents a "snap shot" of the contents of the source image 200 at the time of generation. If the source image 200 is edited or changed, the skeleton 300 representing it must be regenerated. The processing time and requirement to reprocess the source image 200 to create the skeleton 300 each time that it is edited represent such lag time as to make any "on the fly" interactive automatic detection unusable.

The image processing program 118 eliminates or greatly reduces these disadvantages allowing the use of a skeleton 300 for interactive detection of raster geometry. The method of the preferred embodiment of the present invention is to subdivide the source image 200 into sub-regions indicated by the tiles 202–216. These tiles 202–216 are rectangular and are arranged as a grid over the source image 200. The image processing program 118 then generates the skeleton 300 for the source image 200 corresponding to any tile 202–216, caches that information for fast repeated response, and invalidates the cache 120 in the event of an edit change to the source image 200.

With the preferred embodiment of the present invention in place, the image processing program 118 can require that the skeleton 300 be generated on an "as needed basis" for its processing. As the skeleton 300 is generated on an "as needed basis" as delimited by the size of the enclosing tiles 202–216, the processing time for the generation of the skeleton 300 is proportional to size of the tile 202–216 being processed instead of the source image 200 as a whole. As each tile 202–216 is processed, it is stored in cache 120 for multiple accesses, so that only a first request incurs the overhead of the skeleton 300 generation process. As the source image 200 is edited, the cached tiles 202–216 are marked as invalid, thereby requiring the sub-region to be regenerated to satisfy the next request. This then allows the image processing program 118 to be able to depend on the responsive generation of the skeleton 300 for "on the fly" interactive functions.

General Logic

Figure 4:
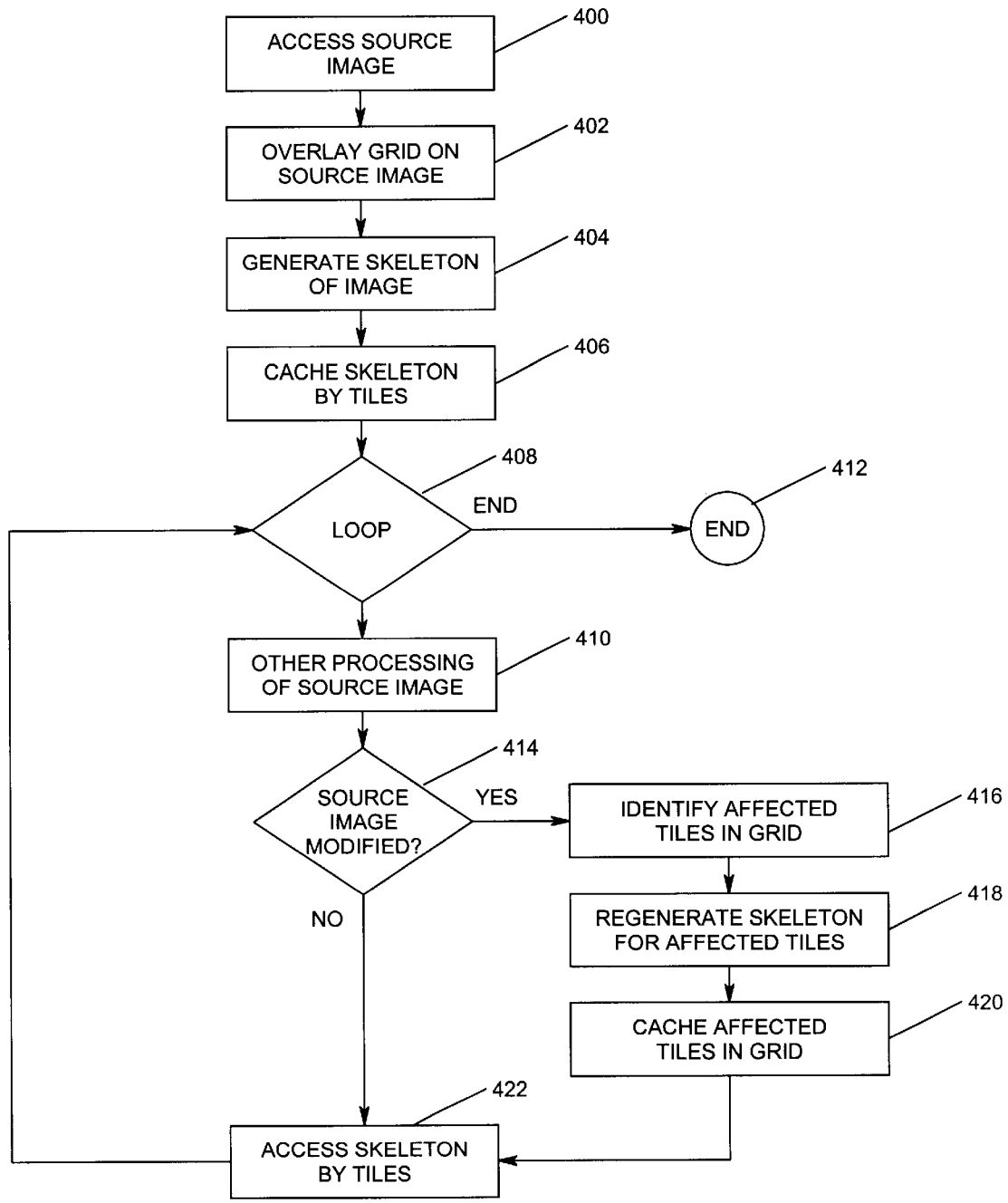
FIG. 4 is a flowchart that illustrates the general logic of the preferred embodiment of the present invention.

FIG. 4 is a flowchart that illustrates the general logic of the preferred embodiment of the present invention.

Block 400 represents the image processing program 118 accessing the source image 200.

Block 402 represents the image processing program 118 overlaying the source image 200 with a grid of tiles 202–216, wherein the size of the tiles 202–216 can be selected as desired.

Block 404 represents the image processing program 118 generating the skeleton 300 for the sub-regions of the source image 200 represented by the grid of tiles 202–216.

Block 406 represents the image processing program 118 caching 120 the generated skeleton 300, wherein each of the sub-regions of the skeleton 300 represented by the grid of tiles 302–316 is discretely retrievable from the cache 120.

Blocks 408–422 represent a processing loop within the image processing program 118. Upon completion of the processing loop, the logic terminates at Block 410.

Block 412 represents the image processing program 118 performing other processing of the source image 200.

Block 414 is a decision block that represents the image processing program 118 determining whether the source image 200 has been modified during the processing of the source image 200 at Block 412. If so, control transfers to Block 416; otherwise, control transfers to Block 422.

Block 416 represents the image processing program 118 identifying which tiles 202–216 in the grid overlaying the source image 200 have been affected by the modifications.

Block 418 represents the image processing program 118 regenerating the skeleton 300 for the source image, but only for the tiles 302–316 that correspond to the affected tiles 202–216 in the grid overlaying the source image 200.

Block 420 represents the image processing program 118 caching the regenerated tiles 302–316.

Block 422 represents the image processing program 118 accessing the tiles 302–316 of the skeleton 300 that correspond to the tiles 202–216 in the grid overlaying the source image 200.

Thereafter, control transfers back to Block 408.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any computer program, application or operating system performing skeletonization could benefit from the present invention.

Those skilled in the art will recognize that additional applications and functions may also be implemented using the steps of the present invention. In addition, the present invention can be integrated closely with many different image processing applications.

In summary, the present invention discloses a method, apparatus, and article of manufacture for producing a skeleton from a raster image by overlaying a plurality of tiles on the raster image, wherein each of the tiles identifies a sub-region of the raster image. The sub-regions are selectively skeletonized and then cached for subsequent access. Some or all of the cache is invalidated when one or more of the sub-regions are modified. Only those sub-regions that have been modified are re-skeletonized, on an "as needed" basis.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A method for processing of a raster image, comprising:
    (a) overlaying a plurality of tiles on the raster image, wherein each of the tiles identifies a sub-region of the raster image comprised of a plurality of pixels;
    (b) selectively skeletonizing the sub-regions of the raster image; and
    (c) selectively regenerating the skeletonized sub-regions of the raster image when the sub-regions are modified, by skeletonizing only those sub-regions of the raster image that have been modified.

2. The method of claim 1, further comprising caching the sub-regions of the raster image.

3. The method of claim 2, further comprising accessing the cached sub-regions of the raster image.

4. The method of claim 2, wherein at least part of the cache is invalidated when the image is modified.

5. The method of claim 1, wherein the selectively skeletonizing step comprises selectively deleting one or more pixels from the source image in such a way as to leave at least one pixel for each line of the raster image.

6. The method of claim 1, wherein the sub-regions of the raster image are skeletonized on an "as needed" basis.

7. The method of claim 6, wherein the "as needed basis" is delimited by the tiles' size.

8. The method of claim 1, wherein the tiles are rectangular.

9. The method of claim 8, wherein the tiles are arranged as a grid over the source image.

10. The method of claim 1, wherein a processing time for selectively skeletonizing the sub-regions of the raster image is proportional to the tiles' size.

11. A computer-implemented apparatus for processing a raster image, comprising:
    (a) a computer;
    (b) means, performed by the computer, for overlaying a plurality of tiles on the raster image, wherein each of the tiles identify a sub-region of the raster image comprised of a plurality of pixels;
    (c) means, performed by the computer, for selectively skeletonizing the sub-regions of the raster image; and
    (d) means, performed by the computer, for selectively regenerating the skeletonized sub-regions of the raster image when the sub-regions are modified, by skeletonizing only those sub-regions of the raster image that have been modified.

12. The apparatus of claim 11, further comprising means for caching the sub-regions of the raster image.

13. The apparatus of claim 12, further comprising means for accessing the cached sub-regions of the raster image.

14. The apparatus of claim 12, wherein at least part of the cache is invalidated when the image is modified.

15. The apparatus of claim 11, wherein the means for selectively skeletonizing comprises means for selectively deleting one or more pixels from the source image in such a way as to leave at least one pixel for each line of the raster image.

16. The apparats of claim 11, wherein the sub-regions of the raster image are skeletonized on an "as needed" basis.

17. The apparatus of claim 16, wherein the "as needed basis" is delimited by the tiles' size.

18. The apparatus of claim 11, wherein the tiles are rectangular.

19. The apparatus of claim 18, wherein the tiles are arranged as a grid over the source image.

20. The apparatus of claim 11, wherein a processing time for the means for selectively skeletonizing the sub-regions of the raster image is proportional to the tiles' size.

21. An article of manufacture embodying one or more instructions readable by a processor for processing of a raster image, comprising:
    (a) overlaying a plurality of tiles on the raster image, wherein each of the tiles identify a sub-region of the raster image comprised of a plurality of pixels;
    (b) selectively skeletonizing the sub-regions of the raster image; and
    (c) selectively regenerating the skeletonized sub-regions of the raster image when the sub-regions are modified, by skeletonizing only those sub-regions of the raster image that have been modified.

22. The article of manufacture of claim 21, further comprising caching the sub-regions of the raster image.

23. The article of manufacture of claim 22, further comprising accessing the cached sub-regions of the raster image.

24. The article of manufacture of claim 22, wherein at least part of the cache is invalidated when the image is modified.

25. The article of manufacture of claim 21, wherein the selectively skeletonizing step comprises selectively deleting one or more pixels from the source in such a way as to leave at least one pixel for each line of the raster image.

26. The article of manufacture of claim 21, wherein the sub-regions of the raster image are skeletonized on an "as needed" basis.

27. The article of manufacture of claim 26, wherein the "as needed basis" is delimited by the tiles' size.

28. The article of manufacture of claim 21, wherein the tiles are rectangular.

29. The article of manufacture of claim 28, wherein the tiles are arranged as a grid over the source image.

30. The article of manufacture of claim 21, wherein a processing time for selectively skeletonizing the sub-regions of the raster image is proportional to the tiles' size.

* * * * *